Feb. 23, 1971 G. VIGNERI 3,564,935

CHANGE SPEED GEARING

Filed Aug. 29, 1969 2 Sheets-Sheet 1

INVENTOR.
GIUSEPPE VIGNERI
BY
Victor J. Evans & Co
ATTORNEYS.

Feb. 23, 1971  G. VIGNERI  3,564,935

CHANGE SPEED GEARING

Filed Aug. 29, 1969  2 Sheets-Sheet 2

INVENTOR.
GUISEPPE VIGNERI
BY
*Victor J. Evans & Co*
ATTORNEYS.

3,564,935
Patented Feb. 23, 1971

3,564,935
CHANGE SPEED GEARING
Giuseppe Vigneri, 102 Warwick St.,
Newark, N.J. 07105
Filed Aug. 29, 1969, Ser. No. 854,042
Int. Cl. F16h *3/34, 57/00*
U.S. Cl. 74—354          6 Claims

ABSTRACT OF THE DISCLOSURE

An input shaft carrying a driving gear is surrounded by a rockable plate carrying pinions engaged with said driving gear and adapted to selectively engage oppositely arranged gears forming part of a series of arcuately disposed power transmission gears whereby rocking of said rockable plate to engage one pinion with its associated gear drives the shaft of the gear at the opposite end of the train in one direction at a certain speed, and rocking the plate in the opposite direction disengages said one pinion and engages the other pinion with its associated gear to drive the shaft thereof at a different speed.

SUMMARY OF THE INVENTION

A casing provided with division plates forms spaces therebetween to receive various gears of the mechanism each of which is adapted to mesh with another gear. Several of these gears, each arranged on a shaft, are arranged arcuately around the axis of a driving shaft carrying a driving gear. A plate is mounted to rock on the driving shaft and carries circumferentially spaced pinions mounted on axes parallel to the driving shaft. The arcuately arranged gears comprise a train of interconnected gears and shafts and the end gears of such train are adapted to be selectively engaged by the pinions upon the rocking of the plate. One end gear of the train is provided with a driven shaft and the speed of rotation of this shaft depends on whether the pinion associated with said one end gear is engaged therewith or the other pinion is engaged with the gear at the opposite end of the train. When the pinion associated with the gear of the driven shaft is meshed therewith there will be a direct drive from the driving gear through the last-named pinion to the gear of the driven shaft. When the plate is rocked to disengage the last-named pinion from its gear and engage the other pinion with the gear at the opposite end of the train, the driven shaft will be driven through the train of gears at a rotational speed diffeernt from its speed when directly driven from its associated pinion.

DESCRIPTION OF THE PREFERRED EMBODIMENT

Figures 1, 2:
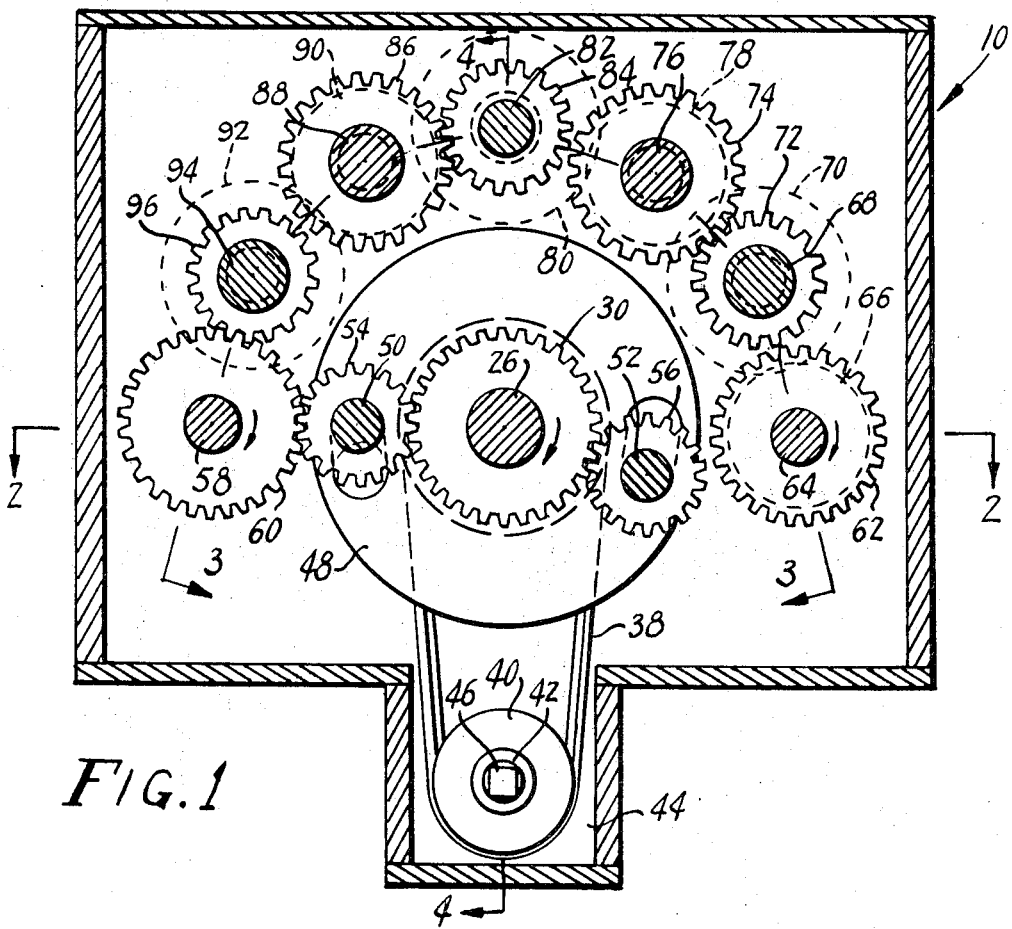
FIG. 1 is plan view of the gearing, assuming that the top plate of the casing and the division plates are omitted to show the gearing in solid lines.
FIG. 2 is a section on line 2—2 of FIG. 1.
Figure 3:
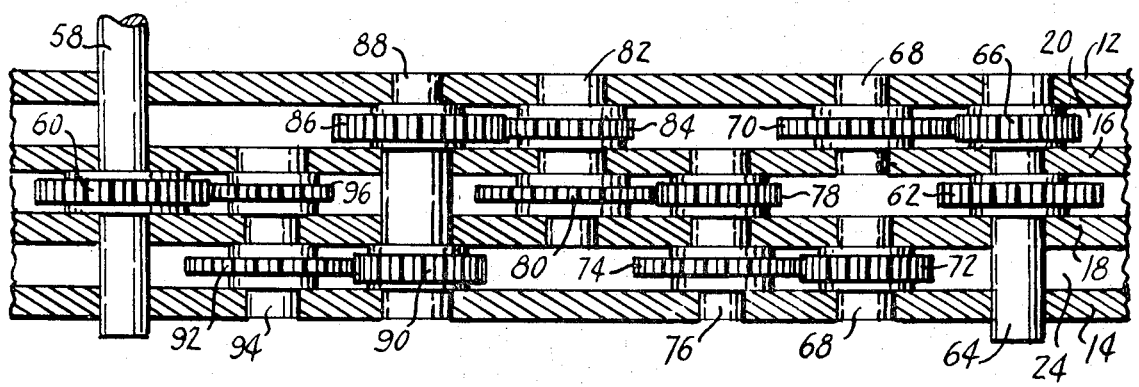
FIG. 3 is a section on line 3—3 of FIG. 1 taken around the arc of arrangement of the train of gears.
Figure 4:
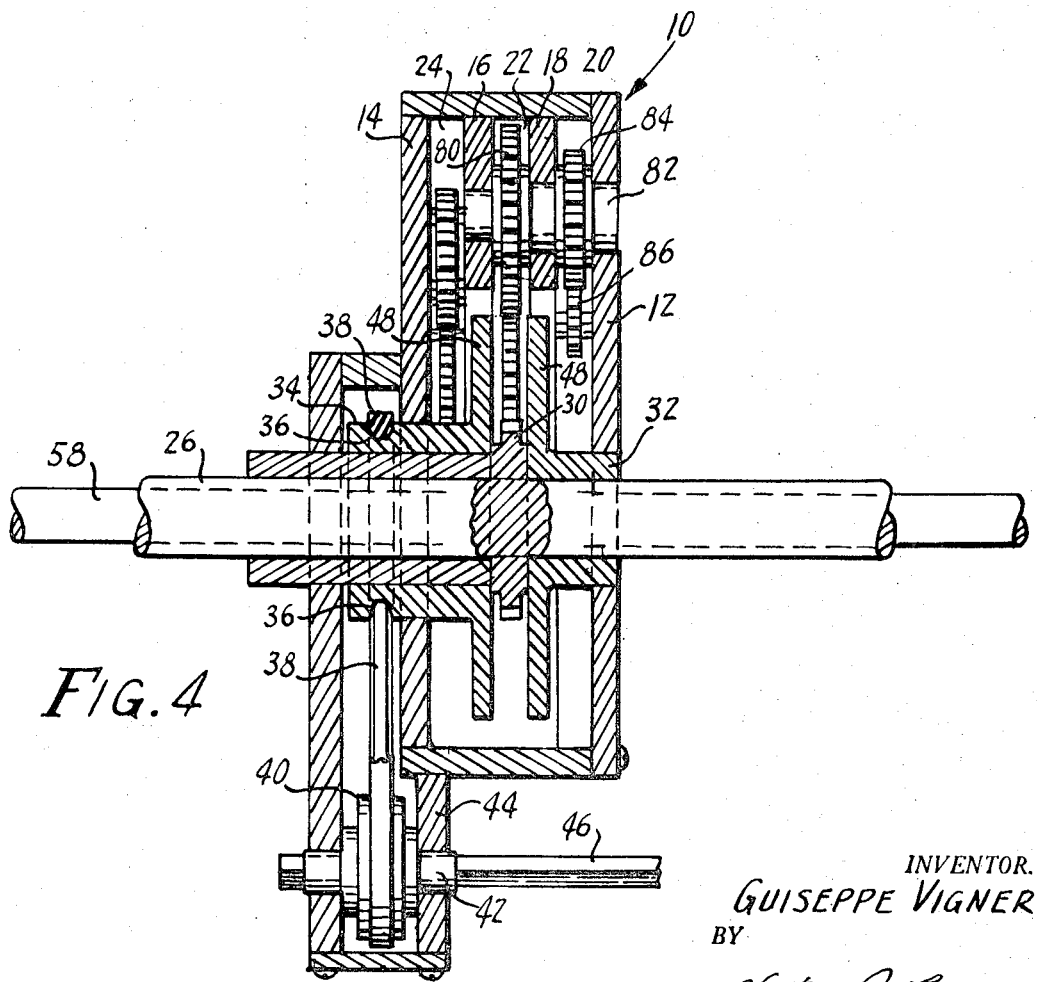
FIG. 4 is a section on line 4—4 of FIG. 1.

Referring to the drawings, the numeral 10 designates as a whole the casing for the gearing comprising a top plate 12, a bottom plate 14 and division plates 16 and 18 forming spaces 20, 22 and 24 in which are arranged gearing to be described.

Centrally of the width of the mechanism is arranged a driving shaft 26 journaled in a sleeve 28 carried by the bottom plate 14 and on this shaft is fixed a gear 30 arranged between upper and lower hubs 32 and 34 as viewed in FIG. 2. These hubs are respectively journaled in the plate 12 and on the sleeve 28. The hub 34 is annularly grooved as at 36 for the reception of a belt 38 the other end of which passes around a pulley 40 mounted on a shaft 42 journaled in a casing extension 44. One end of the shaft 42 is polygonal as at 46 to be engaged by a suitable wrench to turn the shaft 42, and means not shown will be provided for holding the wrench in either of two selected positions as described below.

The hubs 32 and 34 are provided with co-acting outstanding spaced flanges 48 in which are journaled stub shafts 50 and 52, respectively carrying pinions 54 and 56. The axes of the shafts 50 and 52 are parallel to the axis of the shaft 26 and equidistantly spaced therefrom so that both pinions 54 and 56 are constantly in mesh with the gear 30. It will be apparent that the rocking of the shaft 42 will rock the hubs 32 and 34 to move the pinions 54 and 56 between their solid- and dotted-line positions in FIG. 1.

Referring to FIGS. 1 and 2, a shaft 58 is journaled in the plates 16 and 18 and may project through the top and bottom plates 12 and 14 as viewed in FIG. 2. In the space 22 the shaft 58 carries a gear 60 adapted to mesh with the pinion 54 when the pinions 52 and 54 are arranged in the solid-line positions shown in FIG. 1. In the same space 22 is arranged a gear 62 mounted on a shaft 64 journaled in the top plate 12 and in the plates 16 and 18. Referring to FIG. 1, it will be noted that if the hubs 32 and 34 and their plates 48 are rotated counterclockwise, the pinion 54 will be disengaged from the gear 60 and the pinion 52 will be engaged with the gear 62. In the space 20 (FIG. 2) the shaft 64 is provided with a smaller gear 66 to be referred to later.

Extending through the top and bottom walls 12 and 14 and through the division plates 16 and 18 is a shaft 68 on which is mounted a gear 70 in the space 20 meshing with the pinion 66. In the space 24, the shaft 68 is provided with a pinion 72 meshing with gear 74 mounted on a shaft 76 extending through and journaled in the bottom plate 14 and division plates 16 and 18. In the space 22, the shaft 76 is provided with a pinion 78 meshing with a gear 80 mounted in the same space and fixed on a shaft 82 extending through and journaled in the top plate 12 and division plates 16 and 18. In the upper space 20, the shaft 82 is provided with a pinion 84 meshing with a gear 86 mounted on a shaft 88 extending through the top and bottom plates and division plates 16 and 18 and journaled therein.

In the space 24 the shaft 88 has mounted thereon a pinion 90 meshing with a gear 92 fixed on a shaft 94 journaled in the division plates 16 and 18 and bottom plate 14. This shaft, in the space 22, carries a pinion 96 meshing with the gear 60.

OPERATION

Power is applied to the driving shaft 26 and either of the shafts 58 or 64 may project from the casing 10 to constitute the driven shaft. It will be assumed that the shaft 64 is the driven shaft. If the plates 48 are rocked to the positions shown in FIG. 1, the pinion 54, in constant mesh with the gear 30, will now be meshed with the gear 60, while the pinion 52, rocked with the plates 48, will be disengaged from the gear 62. The driving of the shaft 26, with the gear 30 meshing with the pinion 54, will cause this pinion to rotate the gear 60 on the shaft 58. The gear 60, in turn, will mesh with the pinion 96 to rotate the shaft 94 together with its gear 92, and this gear in turn meshes with the pinion 90 on the shaft 88. The gear 86, carried by the shaft 88, meshes with the pinion 84 to drive the shaft 82, and the gear 80 on such shaft, meshing with the pinion 78, will drive the shaft 76 to rotate its gear 74.

The latter gear, meshing with the pinion 72, will drive the shaft 68 and the gear 70 on this shaft will rotate the pinion 66 to drive the driven shaft 64.

The gears and pinions on the shafts 58, 94, 88, 82, 76, 68, and 64 constitute a gear train for transmitting power, under the conditions now being considered, from the shaft 58 to the driven shaft 64. The pinion 96, being smaller than the gear 60, will be driven at a higher speed than the latter gear. The same is true of the driving of the pinion 90 by the gear 92, the driving of the pinion 84 by the gear 86, the driving of the pinion 78 by the gear 80, and the driving of the pinion 72 by the gear 74. There will be a step-up in the rotation of the shaft 64 relative to the speed of rotation of the shaft 68 since the gear 70 is larger than the pinion 66. On the whole, however, the gear train will rotate the driven shaft 64 at a lower speed than the speed of rotation of the shaft 58. Since the gears 30 and 60 are approximately the same size and the pinion 54 is an idler gear, the shaft 58 will be driven at approximately the same speed as the driving shaft 26, and for the reasons stated, the shaft 64 will be driven at a lower speed.

If it is desired to rotate the driven shaft 64 at approximately the speed of rotation of the shaft 26, the shaft 42 will be turned to rock the plates 48, through the belt 38, counterclockwise from the position shown in FIG. 1. Under such conditions, the pinion 54 will be moved to its dotted-line position in FIG. 1, out of mesh with the gear 60, while the pinion 56 will be moved to its dotted-line position in FIG. 1 to mesh with the gear 62 and thus transmit power to the driven shaft 64.

Since the pinion 56 is an idler, it will be apparent that the driving of the shaft 64 will be approximately at the same speed as the rotation of the shaft 26, the gears 30 and 62 being approximately of the same size. Assuming that the shaft 26 is rotating clockwise as indicated by the arrow in FIG. 1, the pinion 56 will rotate counterclockwise, while the shaft 64 will rotate clockwise, the same as the shaft 26.

Through the gear train, rotation is the same for every other set of gears. For example, if the shaft 26 is rotated clockwise, the same is true of the shafts 58, 88, 76 and 64. Thus, whether the driven shaft is driven through the pinion 56 or through the pinion 54, the direction of rotation will be the same. However, when the pinion 56 is operative, the shaft 64 will be driven approximately at the speed of rotation of the shaft 26, but will be driven at a lower speed when the pinion 54 is in the operative position shown in solid lines in FIG. 1.

Obviously, the apparatus may be designed to change the ratios between the various pinions and gears of the gear train according to the desired speed of rotation of the shaft 64 when the pinion 54 is operative. It is likewise obvious that the system may be redesigned to eliminate one of the pinions and its associated gear of the gear train, in which case the shaft 64 will be reversely rotated. If all of the pinions and gears of the gear train are made the same size with one pinion and its associated gear eliminated, the apparatus will operate as a forward or reverse gear with the driven shaft rotating at the same speed in either direction.

Obviously, the implement employed on the hexagonal shaft portion 46 will be provided with means (not shown) for locking it in either of its two operative positions so that torque applied to the plates 48 by rotation of one of the pinions 54 or 56 will not rock these pinions out of their selected positions.

From the foregoing it will now be seen that there is herein provided an improved change speed gearing which accomplishes all of the objects of this invention and others, including many advantages of great practical utility and commercial importance.

As various embodiments may be made of this inventive concept, and as many modifications may be made in the embodiment hereinbefore shown and described, it is to be understood that all matter herein is to be interpreted merely as illustrative, and not in a limiting sense.

What is claimed is:

1. A change speed gearing mechanism comprising a drive shaft, a gear carried thereby, a plate rockable on the axis of said shaft, a pair of pinions carried by said plate at circumferentially spaced points, a pair of laterally spaced gears, a driven shaft carried by one of said spaced gears, the rocking of said plate on the axis of said drive shaft selectively establishing meshing relationship between said first-named gear and either of said spaced gears, and means for transmitting motion from the other of said spaced gears to said one spaced gear when the pinion associated with said other spaced gear establishes meshing relationship with said other spaced gear and with said first-named gear.

2. A mechanism according to claim 1 wherein said means for transmitting motion between said laterally spaced gears comprises a train of gears successively meshing with each other and with said laterally spaced gears.

3. A mechanism according to claim 2 wherein successive meshing gears of said train are of different sizes to transmit to said one spaced gear a speed of rotation different from the speed of rotation imparted thereto when the associated pinion establishes meshing relationship between said one spaced gear and said first-named gear.

4. A mechanism according to claim 3 provided with a casing housing said mechanism and provided with parallel plates providing spaces therebetween for receiving the gears of said train, the gears of said train comprising pairs of gears each mounted on a shaft parallel to the axis of said drive shaft, various of said parallel plates providing bearings for the shafts of the gears of said train.

5. A mechanism according to claim 4 wherein said parallel plates include a bottom plate, a bearing sleeve carried by said plate and in which said driving shaft is rotatable, said rockable plate being mounted to rock on said bearing sleeve.

6. A mechanism according to claim 5 wherein said rockable plate is one of a pair of such plates, each pinion carried by said rockable plates being arranged therebetween and having stub shafts at opposite sides rotatably mounted in said rockable plates.

References Cited
UNITED STATES PATENTS

| | | | |
|---|---|---|---|
| 3,040,599 | 6/1962 | Carlson | 74—354X |
| 3,241,385 | 3/1966 | Tomaro, Jr. | 74—354 |
| 3,496,785 | 2/1970 | Chapman | 74—354 |

LEONARD H. GERIN, Primary Examiner

U.S. Cl. X.R.

74—404, 405